United States Patent [19]

Van Zeeland

[11] Patent Number: 4,891,589

[45] Date of Patent: Jan. 2, 1990

[54] DISPLACEMENT GAUGE THAT COMBINES VECTOR SIGNALS

[75] Inventor: Donald L. Van Zeeland, Franklin, Wis.

[73] Assignee: Eaton Corporation, Cleveland, Ohio

[21] Appl. No.: 302,485

[22] Filed: Jan. 27, 1989

Related U.S. Application Data

[63] Continuation-in-part of Ser. No. 137,045, Dec. 23, 1987.

[51] Int. Cl.$^4$ .............................................. G01B 7/14
[52] U.S. Cl. .................................... 324/207; 324/226
[58] Field of Search ............... 324/207, 208, 226, 227, 324/234–236, 239, 243, 260–262

[56] References Cited

U.S. PATENT DOCUMENTS

| | | | |
|---|---|---|---|
| 4,422,041 | 12/1983 | Lieuau | 324/208 X |
| 4,535,624 | 8/1985 | Ginns et al. | 324/208 X |
| 4,580,097 | 4/1986 | Bartlett | 324/207 X |
| 4,639,667 | 1/1987 | Andresen | 324/208 |
| 4,639,668 | 1/1987 | Petit et al. | 324/208 |
| 4,661,773 | 4/1987 | Kawakita et al. | 324/208 |
| 4,663,601 | 5/1987 | Troutman et al. | 324/208 X |
| 4,723,503 | 2/1988 | Yuda | 324/208 X |
| 4,733,214 | 3/1988 | Andresen | 324/208 X |
| 4,746,791 | 5/1988 | Forkel | 324/208 X |

Primary Examiner—Reinhard J. Eisenzopf
Assistant Examiner—Warren S. Edmonds
Attorney, Agent, or Firm—C. H. Grace

[57] ABSTRACT

A displacement sensor or displacment gauge (3) for detecting misalignment measures the dislocation of a machine part, such as a post (12), by means of four magnetic coils (24N, etc.) deployed 90° apart around the post and each energized by an oscillator (36N, etc.). A reference position of the machine part (12) relative to another component (6) of the machine is first established. Subsequent displacement is detected and excessive displacement is indicated if it exceeds a predetermined threshold magnitude.

Signals from the four coils are processed combined in such a way that the magnitude of the radius of a displacement of the machine part (12) from the reference position is ascertained and provided irrespective of the direction of the displacement. The provided signal equals the greatest of the absolute values of (a) a north-/south displacement signal, (b) and east/west displacement signal, and (c) one or more combination signals that are derived from the north/south and east/west absolute value signals, and that represent the displacement in various intermediate directions e.g., east by northeast.

7 Claims, 9 Drawing Sheets

DISPLACEMENT GAUGE THAT COMBINES VECTOR SIGNALS

This invention is a Continuation-In-Part of a patent application Ser. No. 137,045, entitled "Displacement Gauge", filed Dec 23, 1987, by inventors E. F. Duncan, G. L. Nadolski, and D. L. Van Zeeland. It is assigned to the assignee of the present invention, and is incorporated herein by reference.

FIELD OF THE INVENTION

The invention relates to position sensing devices and in particular to devices for indicating displacement of one object with respect to another. For example, in a machine, if one component is intended to remain in a predetermined position with respect to a reference component, the two components can be instrumented with a displacement sensor that provides a warning signal when the first component is displaced from the predetermined position by more than a few thousandths of an inch.

SUMMARY OF THE INVENTION

An objective of the invention is to provide a displacement sensor capable of sensing and indicating the displacement of an object from a nominal position with respect to a reference object, with substantially uniform omnidirectional sensitivity.

Another objective, narrower than the first, is to provide a displacement sensor that senses the displacement of an object from a predetermined nominal position, with respect to a reference object, in two dimensions, i.e., to sense the displacement within a plane, with substantially uniform omnidirectional sensitivity.

Another objective is to sense the displacement of an object in any direction in a plane, by means of a plurality of position detectors disposed in an array about the object whose displacement is to be sensed, and to process the signals of the position detectors in such a way as to provide an output signal whose ratio to the displacement that produced it is substantially uniform irrespective of the direction of displacement in the plane.

Another objective is to provide a displacement sensor that provides an output signal dependent upon the displacement of one object with respect to another in a plane, substantially independently of the direction of displacement, and an indication when the displacement exceeds a predetermined reference amount.

DETAILED DESCRIPTION

In order to explain the invention most clearly three preferred embodiments having different accuracies are described in detail. Many other embodiments that are not described are also intended to be within the scope of the patent claims.

Figure 1A:
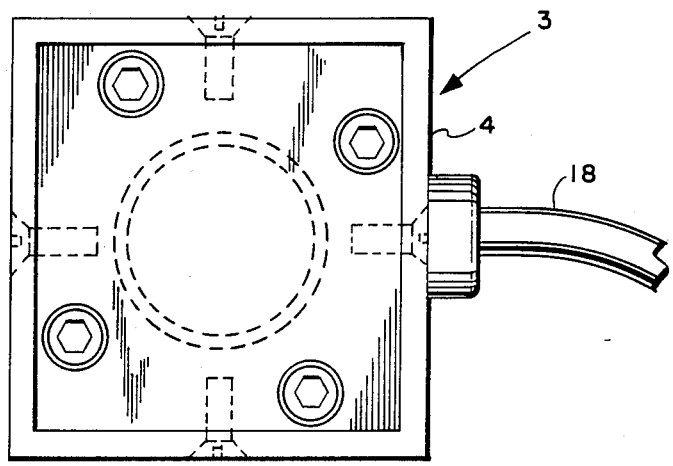
FIG. 1A is a top view of a preferred embodiment of the invention.
Figure 1B:
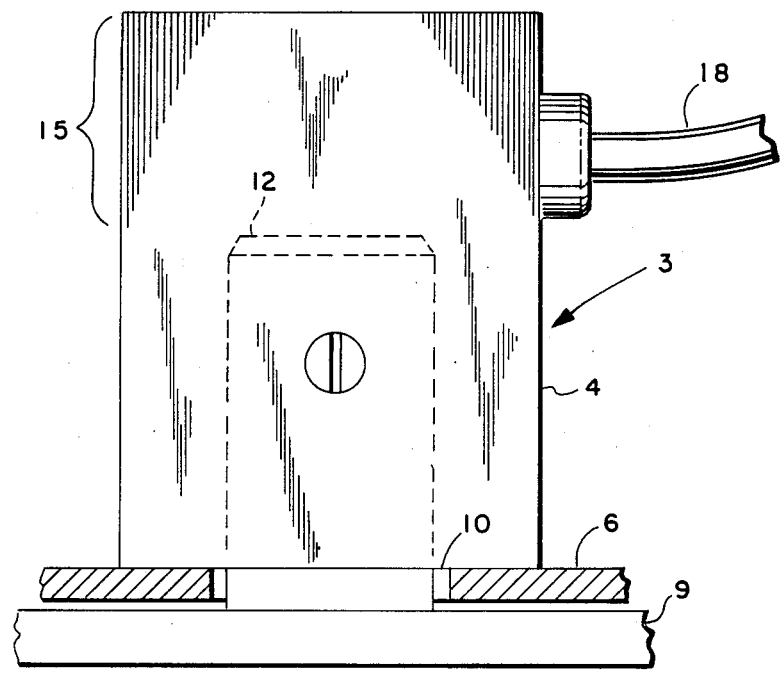
FIG. 1B is a side view of the same embodiment, with a right circular cylindrical post shown in dotted lines.

The preferred embodiments of the displacement sensor 3 include a housing assembly 4 (FIG. 1A), which is mounted on a reference plate 6 (FIG. 1B). A coupling back plate 9 is the machine component whose horizontal position with respect to the reference plate 6 is to be monitored. A post 12 is mounted on the coupling back plate 9; it protrudes through a hole 10 in the reference plate 6, as shown in FIG. 1B. A cable 18 of electric wires enters an electronic circuit compartment of the housing assembly 4, as indicated by the area 15 at the top of the housing assembly. When the coupling back plate 9 and its post 12 are displaced more than 0.003 inch in any horizontal direction with respect to the reference plate 6, the displacement sensor provides an indication of the amount of misalignment and, if appropriate, an excessive-misalignment output signal.

The preferred embodiment being described is for use with a turret lathe, only relevant portions of which are shown in the figures. The turret lathe has a huge rigid casting, which includes its machine bed. A rotatable work piece that is to be machined is located with reference to the machine bed.

The lathe also has a turret that has tool pockets, i.e., sockets where various cutting tools, drills, taps, etc. are mounted. During operation of the lathe the turret is occasionally rotated through an angle (i.e., indexed) to bring the next tool into position to perform its function, in turn, on the revolving workpiece.

When the rotatable turret is in the correct angular position for the first one of its tools to do its work, the turret is held tightly in that angular position by a clamping mechanism, which is called a "curvic". The curvic consists of two toothed members that look like gears. A first toothed member of the curvic is on the turret. While the first tool is doing its work, the toothed members of the curvic are held tightly in engagement with each other under great force. This prevents the turret from rotating.

After the first tool has done its work, one toothed member of the curvic is withdrawn to disengage it from the other toothed member. This frees the turret, permitting it to rotate. The turret is then rotated to a second position, in which a second tool has access to the work piece. The curvic is then engaged again, by again pressing its first toothed member into forceful engagement with its second toothed member. The curvic again prevents the turret from rotating, so that the second tool can perform its machining function accurately.

It is desirable to be able to slightly adjust the locked position (i.e., the position when the curvic is engaged) of the turret with respect to the machine bed (and therefore with respect to the work piece). To enable the desired adjustment to be made, the second toothed member of the curvic is a "back plate" whose position is adjustable with respect to the machine bed. The back plate is ordinarily adjusted to a desired position and locked there. This arrangement permits some slight relocation of the turret's locked position with respect to the machine bed.

Sometimes the turret is subjected to great force during an accident or malfunction. This is referred to as a machine "crash". When a machine crash occurs a powerful force may be transmitted from the turret through the teeth of the first member of the curvic to the back plate, which is the second toothed member of the curvic.

Sometimes the back plate is bumped so hard in a crash that it is slightly displaced from its preset desired position. That dislocation would reduce the accuracy of subsequent machining operations if not corrected, and should therefore be detected and corrected before proceeding. The gauge of this invention is provided to detect when the back plate has been displaced from its desired original reference position.

FIG. 1B can be used to explain the relationship of the invented gauge to the turret lathe described above. The reference plate 6 is rigidly mounted to the machine bed; it can be thought of as the main stationary frame of reference of the entire situation. The housing 4 of the invented gauge is mounted to the reference plate 6; consequently the housing 4 can also be regarded as being in a fixed reference location.

The purpose of the invented gauge is to monitor the position of the back plate 9 with respect to the reference plate 6. The facilitate this, the post 12 is fixedly mounted on the back plate 6, so the position of the post 12 is representative of the position of the back plate 6. The post 12 therefore serves as a target whose position is to be monitored.

While a dislocating crash of the machine is occurring, the turret applies great force to the first toothed member of the curvic, which is mounted on the turret. The first toothed member transmits the crash force to the second toothed member of the curvic, which is the back plate 9. The back plate 9 (and its post 12) are moved, and don't bounce all the way back to their preset positions.

The gauge housing 4 has not moved because it is fixed to the machine bed. The displacement of the post 12 relative to the housing 4 of the invented gauge is measured by the gauge. When that displacement exceeds a predetermined limit, the invented gauge provides a signal disclosing that a dislocation of the back plate 9 has occurred.

Figure 2A:
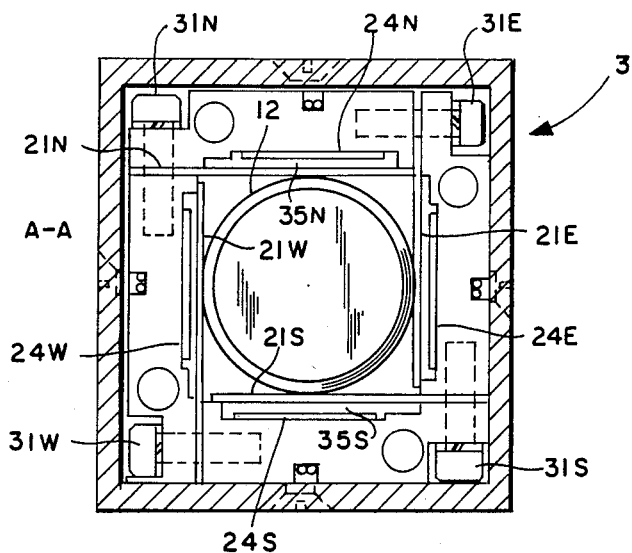
FIG. 2A is a cross-sectional view along plane A—A of the same sensor.

In FIG. 2A the post 12 is shown in a centered position in the displacement sensor. During setup the housing assembly 4 and its components are free to move horizontally with respect to the reference plate 6 and the post 12. Four springs 21N, 21S, 21F and 21W, are spaced apart from each other in a square configuration having slightly smaller internal dimensions than the diameter of the post 12. During setup the housing assembly 4 is pushed down over the post by hand pressure and all four of the springs are deflected slightly, centering the housing assembly on the post. The hosing assembly 4 is then fixed in place to reference plate 6 by screws to serve as a reference of mechanical alignment, i.e., a nominal desired position relative to the post 12.

Figure 3A:
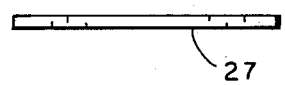
FIGS. 3A and 3B are an edge view and a plane view respectively of a flat steel spring of a type employed in the sensor.
Figure 3B:
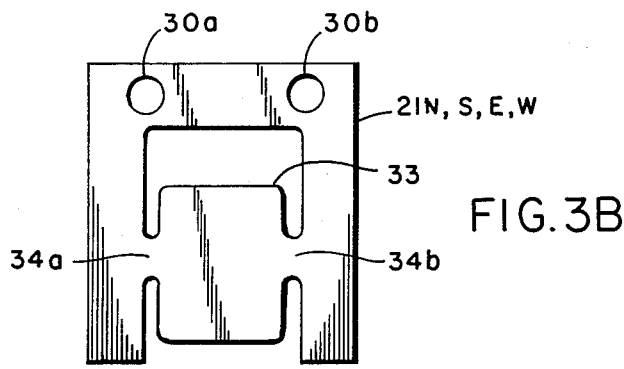

The springs 21N, 21S, 21E 21W, are shown in FIGS. 3A and 3B. They are made from flat spring steel 0.018 inch thick and are heat treated. Each spring has two holes 30a, 30b, for mounting by means of pairs of screws 31N, 31S, 31E and 31W (FIG. 2A). As shown in FIGS. 3A and 3B an approximately rectangular target area 33 is provided on each spring, supported by two web areas 34a and 34b. The target area 33 is a portion of a magnetic circuit that conducts magnetic flux.

Magnetic flux for the displacement sensing function is produced by thin flat magnetic coils 24N, 24S, 24E and 24W, as shown on FIG. 2A. Each coil has 110 turns of no. 35 AWG enameled wire. When current flows in the coil 24N, magnetic flux passes through the coil in a direction generally perpendicular to the plane of the coil and across an air gap 35N to the spring 21N on one side (called the north side for convenience), of the FIG. 2A.

Figure 4B:
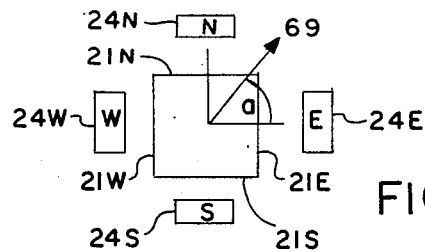
FIG. 4B is a stylized top view of the sensor with an angle of displacement Q defined pictorially.

Displacements of the target 33 with respect to the coils are more easily visualized with the aid of FIG. 4B. In that drawing an oblique direction 69 of displacement of a square composed of springs 21N, 21S, 21E and 21W is shown. The angle that the direction of displacement 69 forms with respect to the easterly direction is marked Q.

Figure 4A:
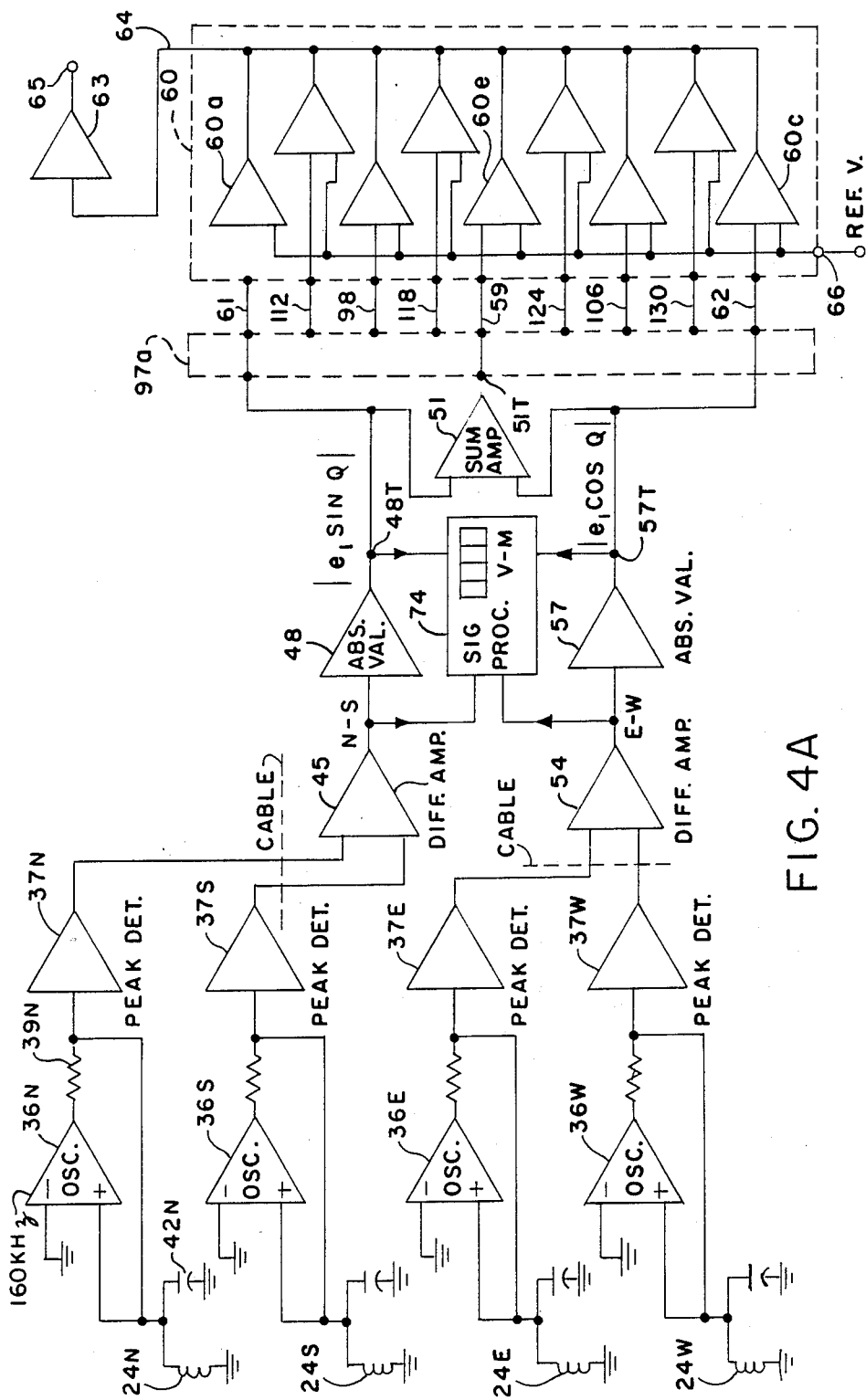
FIG. 4A is a simplified block diagram of electronic circuits of a "first-order" system embodiment of the sensor.

The simplified diagram of FIG. 4A is provided to facilitate description of the general concepts of the electronic portions of the invention. An oscillator 36N (FIG. 4A) provides an AC signal of 160 KHz to energize the proximity sensing coil 24N. The coil is driven through an output resistor 39N. The coil and a capacitor 42N form a tank circuit for the oscillator. Similar circuits are provided in oscillators 36S, 36E and 36W, for driving the other three coils.

A peak detector 37N of known and conventional design senses the peak level of the signal that it receives from the oscillator 36N (FIG. 4A). It rectifies the signal and provides a DC output to one input of a differential amplifier 45. Similar equipment 37S, 37E and 37W perform corresponding functions for the other three directional signals.

The differential amplifier 45 (FIG. 4A) receives signal at its two inputs from the peak detectors 37N and 37S, and subtracts them, to provide a signal dependent upon the north/south component of displacement of the the post 12 relative to the housing assembly 4. When the post 12 is displaced with a north/south component, from its normal center position, the differential amplifier 45 indicates both magnitude and sign of the displacement component. The difference signal is conducted from the output of amplifier 45 to the input of an absolute value circuit 48.

When the post 12 is displaced obliquely as in direction 69 of FIG. 4B, the signal at the output of amplifier 45 is proportional to the sine of the angle Q, as well as the amount of displacement. At the output terminal 48T of the absolute value amplifier 48, the magnitude of the north/south voltage is provided, with a positive sign. The output of amplifier 48, which is a DC signal, is connected to one input of a summing amplifier 51.

In a similar manner, a differential amplifier 54 (FIG. 4A) receives signals from peak detectors 37E and 37W, and produces a difference signal at its output. That difference signal is conducted to an absolute value amplifier 57, which makes the signal positive irrespective of the polarity of its input signal, just as in amplifier 48. In the case of the east/west channel, however, the magnitude of the signal is proportional to the cosine of the displacement's directional angle Q (FIG. 4B). The DC output at terminal 57T of amplifier 57 is connected to a second input of the summing amplifier 51.

Continuing with FIG. 4A, amplifier 51 adds the two input signals that it receives, with equal weight, and multiplies the voltage sum by 0.707. It is the equivalent to say that amplifier 51 averages the signals at terminals 48T and 57T, and multiplies their average by 1.414. Amplifier 51 provides a composite signal that has correct sensitivity for displacements of the post 12 in a direction of Q=45 degrees (northeast) as well as for directions of northwest, southeast, and southwest.

From the output of summing amplifier 51 a composite signal is conducted (through a block 97A) to a first input 59 of a comparator circuit in the block 60, (FIG. 4A) details of which are described below. (The block 97A contains nothing but three conductors; some of its output terminals have no connection in this first-order system. As will be clear later, it is included merely for convenience in describing two more complex embodiments, of FIGS. 9 and 11, in which corresponding blocks 97B and 97C replace block 97A.)

A second input 61 of circuit 60 (FIG. 4A) receives a signal (through the block 97A) from the absolute value amplifier 48, representing the north/south channel. A third input 62 of circuit 60 receives a signal (through the block 97A) from the output 57T of the absolute value amplifier 57, representing the east/west component of displacement of the post 12.

In the block 60, each of these three inputs 59, 61, 62 is first compared with a threshold reference voltage that is applied to a terminal 66 (FIG. 4A). The reference voltage at 66 may be set, for example, at 3 volts to correspond to a displacement of the post 12 of 0.003 inch. Any of those signals that exceed the reference voltage go on to enter an OR-circuit-type portion of circuit 60, which is a maximum signal selection circuit. Of the signals entering the OR-type circuit, that which is highest establishes the output signal of the circuit 60 (FIG. 4A). That output signal is connected to one input 64 of an output circuit 63, where it initiates an alarm signal. (Obviously, the maximum signal of the three signals could instead be selected before a comparison is made with the reference voltage.)

Figure 2B:
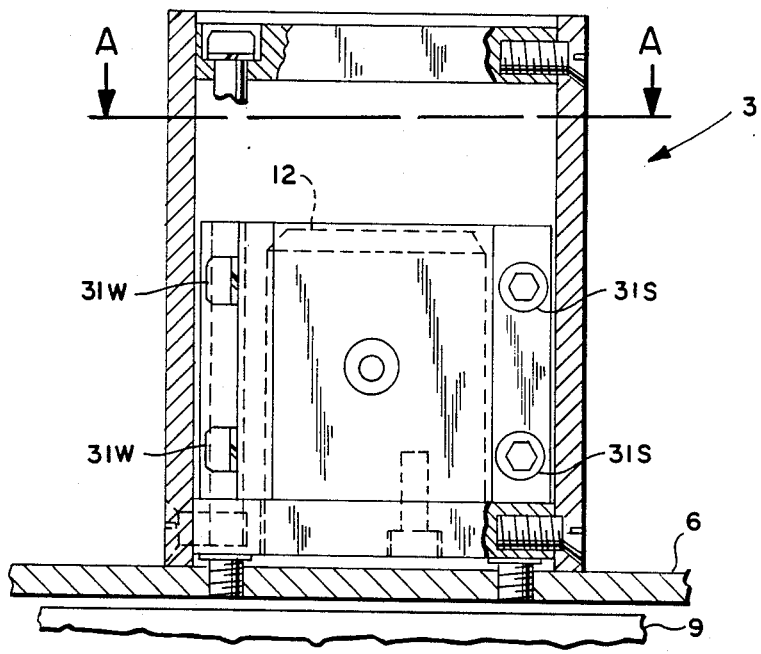
FIG. 2B is a side view showing the location of the plane A—A.

To summarize, relative displacement of the post 12 produces, in general, a difference signal between coils 24N and 24S, and another difference signal between coils 24E and 24W (FIG. 2B). The absolute values of those two difference signals are added together and multiplied by a gain factor (51, FIG. 4A), to produce a composite third signal. The composite third signal is employed to make the sensitivity of the displacement sensor approximately the same for diagonal displacements of the post (northeast/southwest and northwest/southeast) as for displacements along the north/south and east/west axes. Of the three signals, namely north/south, east/west, and composite, the highest signal represents the displacement without regard to its direction. The signals are compared with a reference threshold (66, FIG. 4A), which they must exceed to pass forward as a potential alarm signal. The highest of the excess signals actuates an output circuit 63.

Figure 5:
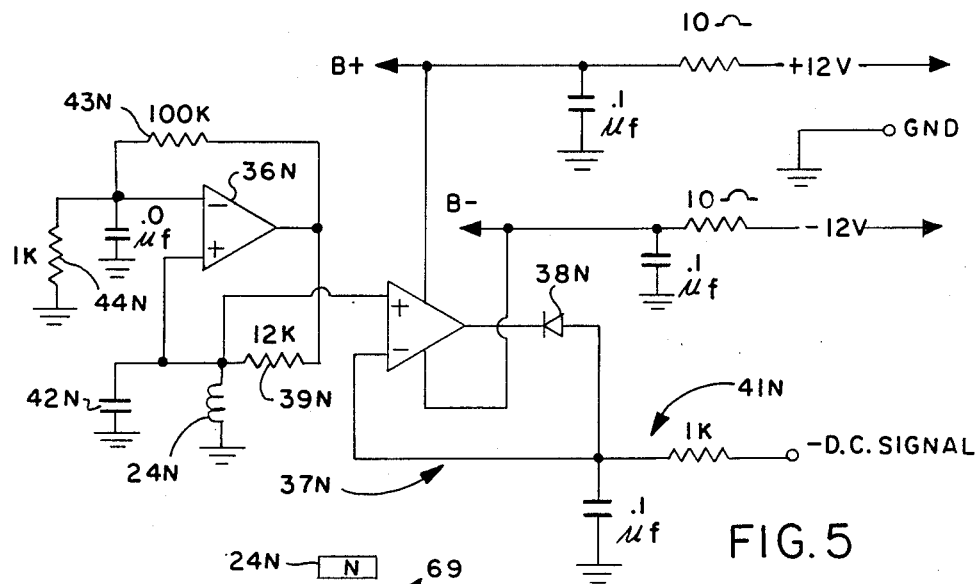
FIG. 5 is a more detailed diagram of a portion of FIG. 4A, namely an electronic preamplifier portion of the North sensor circuits.

In FIG. 5 details are shown of the portion of the circuit of FIG. 4A that is drawn to the left of the dotted line labeled "cable". The oscillator 36N is established by feedback through a resistor connected to the tank circuit. The peak detector 37N is generally indicated on FIG. 5. Only negative output signals are supported because positive signals are blocked by a series output diode 38N. The negative peak output signal is filtered by a pi section resistance/capacitance filter 41N.

Figure 6:
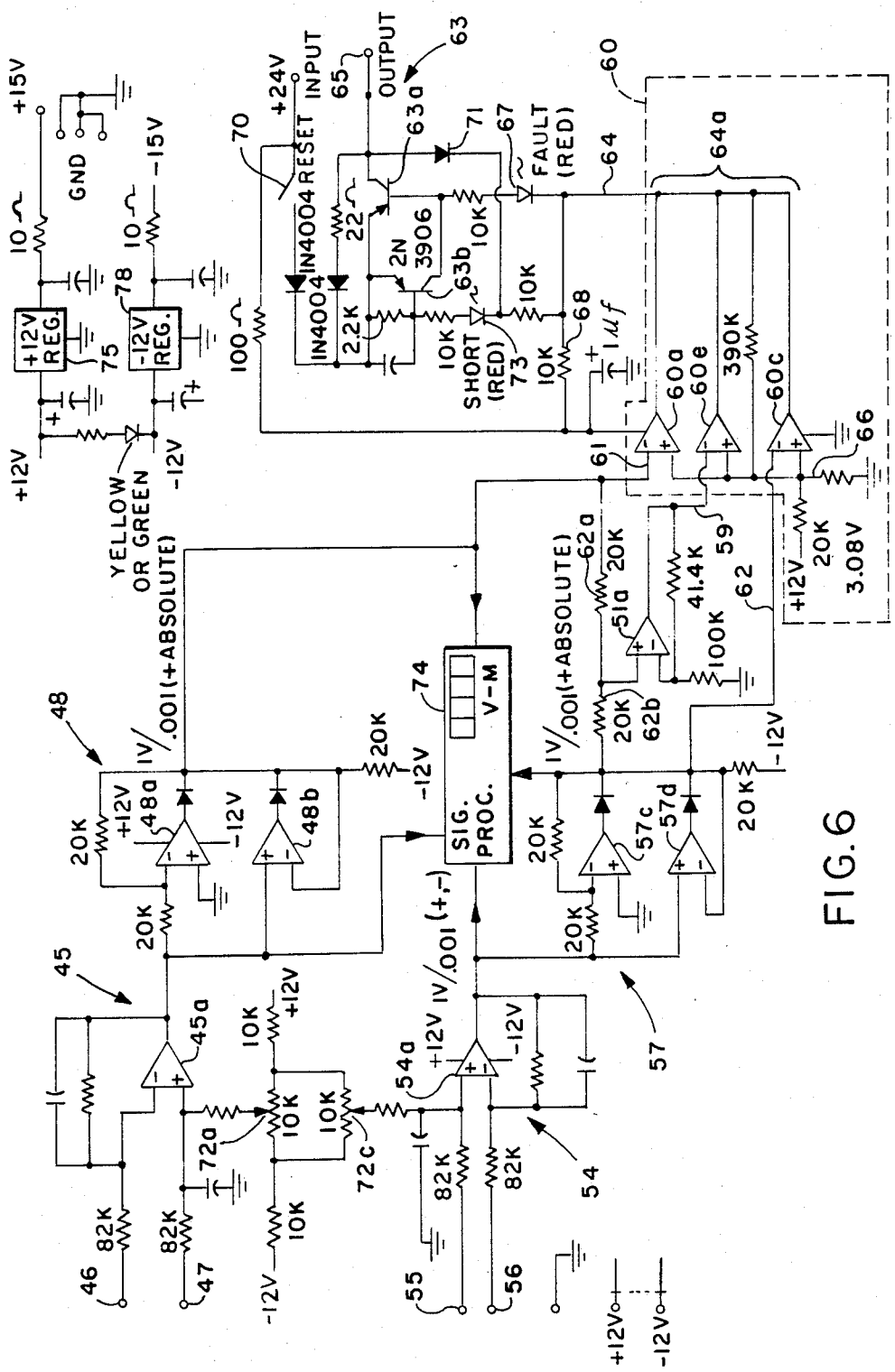
FIG. 6 is a more detailed diagram showing portions of the electronic circuit of a "first-order" system embodiment, namely portions that are down-circuit from the preamplifiers.

In FIG. 6 details of other circuits of FIG. 4A are provided. For convenience the amplifier portion itself (of the complete differential amplifier circuit 45 of FIG. 4A) is denoted by a reference symbol 45a on FIG. 6. The whole circuit 45 includes resistors and capacitors external to the amplifier 45a. Other amplifiers are similarly referenced.

External resistors and capacitors associated with amplifier 45a are conventional and well known for amplifiers of this type (FIG. 6). A potentiometer 72a forms a portion of a voltage divider between a regulated positive 12 volt power supply and a regulated negative 12 volt power supply. The movable arm of potentiometer 72a is adjusted during setup of the apparatus to null the north/south output signal when the post 12 is in the nominal center position. Potentiometer 72a, therefore, provides a fine adjustment of the approximate mechanical self-alignment that is produced by the preloading pressures of the north/south springs 21n and 21s.

Terminals 46 and 47 (FIG. 6) are connected to the coils 24N and 24S (FIG. 4B), respectively. They conduct signals through 82k ohm resistors to the inverting and non-inverting inputs respectively of the amplifier 45a (FIG. 6). Negative feedback is provided by a 0.01 microfarad capacitor in parallel with a 1 megohm resistor connected from the output of amplifier 45a to its inverting input.

The output of amplifier 45a a is also connected to a non-inverting input of an amplifier 48b and through a resistor to the inverting input of another amplifier 48a. Both of the latter amplifiers have diodes in series with their outputs (FIG. 6). A feedback resistor is connected from the connection of the cathode outputs of both of those two diodes to the inverting input of amplifier 48a. Amplifier 48b has negative feedback without a resistor. This arrangement provides full-wave rectification of the signal originally received from amplifier 45a, hence an absolute value output from 48.

The portions of block 60 of FIG. 4 that are utilized in the first-order embodiment are shown in a dashed-line box 60 in FIG. 6. The output of amplifiers 48a and 48 (FIG. 6), which is a positive absolute value, at terminal 61 (and 48T of FIG. 4A), is connected to an inverting input of an amplifier 60a. A non-inverting input of amplifier 60a has applied to it the reference threshold voltage of terminal 66(FIGS. 4A and 6). The output of amplifier 60a is the excess of signal voltage over the reference threshold voltage. It provides one input of a wired-OR type of analog maximum signal selection circuit 64A, whose other input come from amplifiers 60e and 60c.

In a very similar manner, the signals from coils 24E and 24W (FIG. 4A) are connected to terminals 55 and 56 (FIG. 6), and pass through resistors to non-inverting and inverting input terminals, respectively, of an amplifier 54a (FIG. 6). The non-inverting terminal of 54a receives an additive input signal from a potentiometer 72c whose outside legs have positive and negative DC supply voltages and whose transfer arm can be adjusted to null the east/west signal.

The output of amplifier 54a is connected to amplifiers 57c and 57d, whose circuits are the same as those of amplifiers 48a and 48b. Each extracts the positive absolute value of the DC signal which is at its input (FIG. 6). The absolute value is conducted to an inverting input terminal 62 of amplifier 60c whose output must exceed the reference voltage at terminal 66 if it is to be felt in the selection circuit 64A.

The use of absolute values is sufficient for proper functioning of the circuit portion being described because the final output signal from this portion need indicate only the absolute value of the displacement of the post 12, irrespective of the direction of the displacement. For example, a northward displacement of 0.003 inch actuates a go/no-go indicator of misalignment connected to terminal 65, and a southward displacement of 0.003 inch actuates the same indicator (FIG. 6).

From the output of the absolute value circuit 48 (i.e. amplifiers 48a and 48b), an additional connection is made through a 20k ohm resistor 62a to the non-inverting input of an amplifier 51a FIG. 6. In the same way an output from the absolute value circuit 57 is connected through a 20k ohm resistor 62b to that same non-inverting input. The amplifier 51a has a voltage gain of 1.414; its gain is stabilized by feeding back a signal from its output through a 41.4k ohm resistor to the inverting input terminal of the amplifier. A 100k ohm resistor is also connected to that inverting input terminal and its other end is connected to ground.

The output of amplifier 51a at terminal 59 is connected to an inverting input (at 66) of an amplifier 60e whose non-inverting input has the same threshold reference voltage as amplifiers 60a and 60c (FIG. 6). The output of amplifier 60e in excess of the reference voltage component joins the selection circuit 64A. Circuit 64A, therefore, is influenced only by an excess portion of input signals representing the north/south coils, the east/west coils, and a weighted composite of those two signals.

The greatest of the three signals is output from the wired-OR type of analog selection circuit 64a through terminal 64 to the comparator circuit 63 (FIG. 4A, and shown in more detail on FIG. 6 as transistors 63a, 63b, etc.) line 16, delete "by the turning on of a light emitting diode 67". The signal at terminal 64 is of negative polarity. When a signal appears there, a transistor 63a starts conduction at its collector electrode, to provide current at the alarm output terminal 65. Thus, when the predetermined threshold level is exceeded, the voltage at terminal 64 goes low and a misalignment is indicated by the turning on of a light-emitting diode 67.

The output stage 63 is protected against short-circuited loads by a diode 71 and a protective transistor 63b (FIG. 6). The diode 71 conducts current from the output of transistor 63a when the output is high, to a base circuit that biases the transistor 63b to cutoff. When the load on terminal 65 is short-circuited, the transistor 63b conducts. Its collector-emitter circuit is connected from the emitter of transistor 63a to the base of transistor 63a, to prevent conduction of transistor 63a. A short circuit is indicated by a light emitting diode 73. Following overload, the safety circuit can be restored by means of a reset switch 70, as shown in FIG. 6.

Analog and/or digital outputs representing the amount and direction of displacement of the post are indicated by a circuit 74. (FIGS. 4A and 6). The output of circuit 74 is a visual indicator, such as a voltmeter display. If digital output is desired as is preferable, the circuit 74 is a digital voltmeter, and if analog it is an analog voltmeter. It is switchable to measure the value (including the sign if desired) of the north/south signal at the output of amplifier 45, or the value (including the sign if desired) of the east/west signal at the output of amplifier 54. 51. Of course the circuit 74 can be a more capable signal-processing output device if desired, for example it could present the displacement information in polar coordinate form. The direction Q of displacement is the angle whose tangent is the quotient of the north/south signal over the east/west signal.

A power supply regulator of conventional type is provided as shown on FIG. 6. It has a positive 12-volt regulator 75 and a negative 12-volt regulator 78, with filtering and indicating elements of well-known design.

Figure 7:
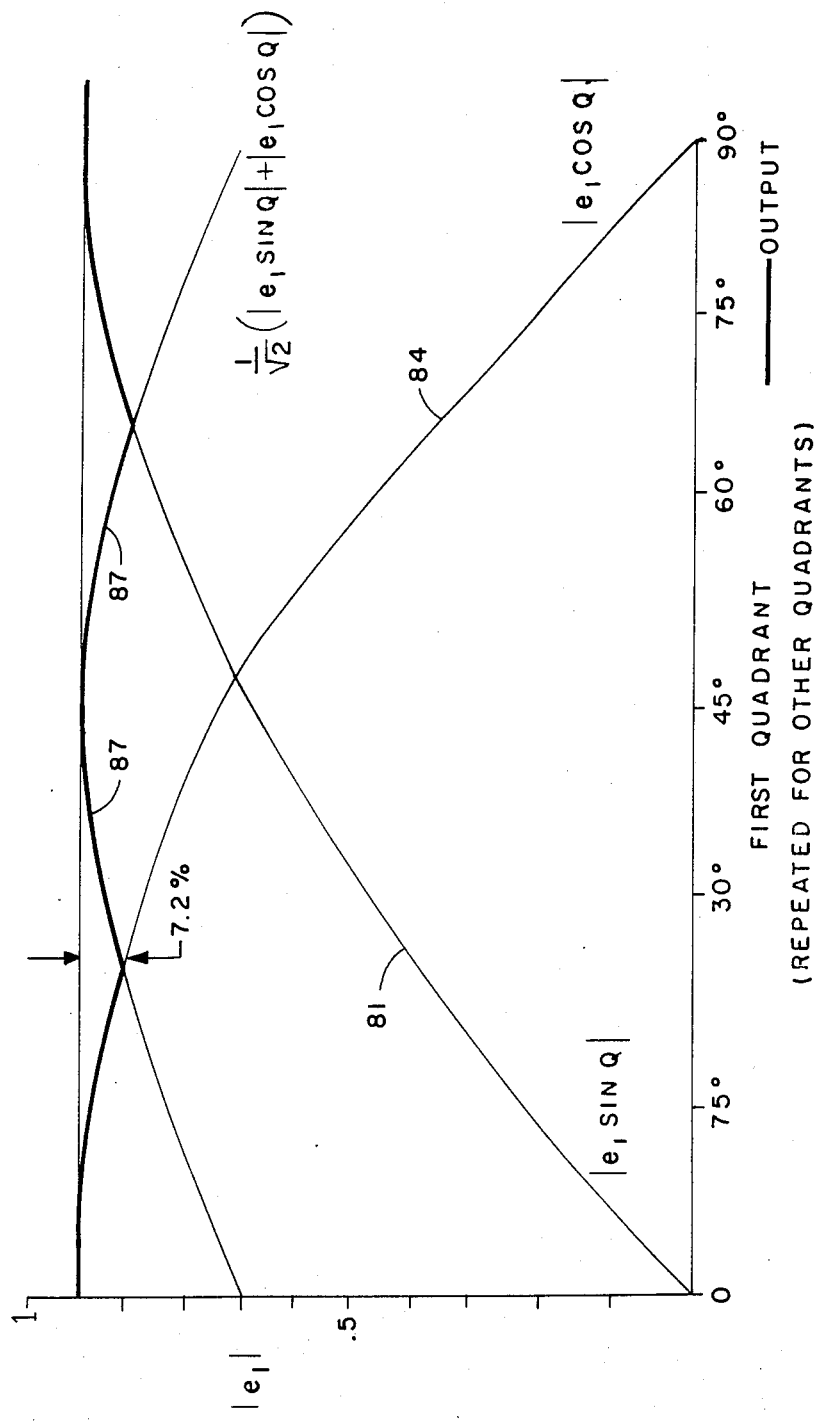
FIG. 7 is a rectangular coordinate graph of the output signal resulting from a uniform magnitude of displacement of the measured object with respect to the reference object as a function of the direction of displacement in a "first-order" system.

FIG. 7 shows a graph 81 of signal voltage, which is the absolute value of a signal in the north/south channel, as at the output 48T of amplifier 48. Curve 84 is the absolute value of a signal in the east/west channel, as at the output of amplifier 57. The curve 87 is the composite signal at the output of amplifier 51a. FIG. 7 shows that the approximate method that is employed for treating oblique displacements results in an error in the range of only zero to minus 7.2 percent in this first-order system. By change of gain of an amplifier to split the error, the error range could be made plus or minus 3.6 percent.

Figure 8:
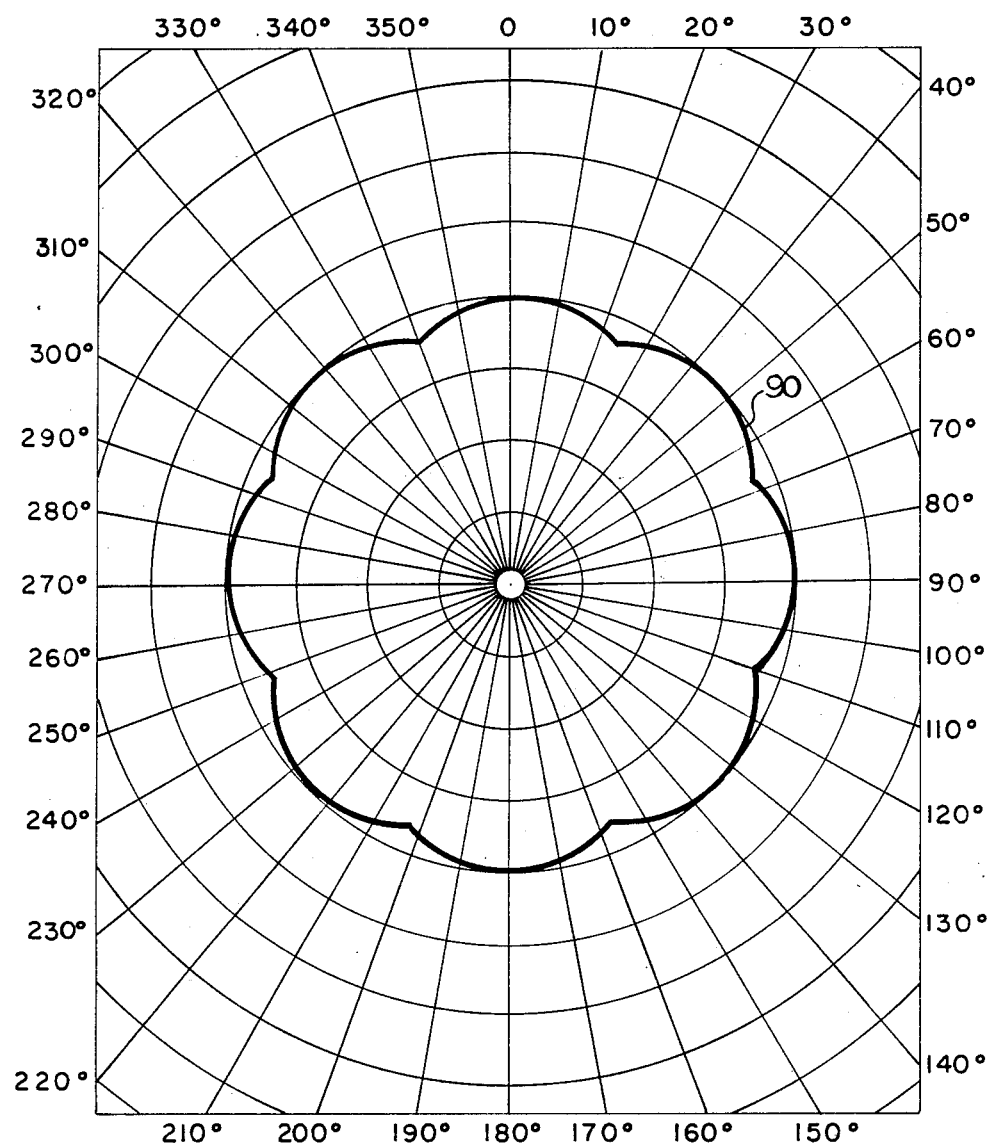
FIG. 8 is a polar coordinate graph of the displacement sensitivity of the sensor as a function of direction of displacement, i.e., a response pattern, for a "first-order" system.

FIG. 8 shows a curve 90, which is the directional sensitivity pattern of displacement of the post 12 in the case of the first-order system that has been described thus far. It is seen to be nearly circular in the horizontal plane except for its eight dimples.

Figure 9:
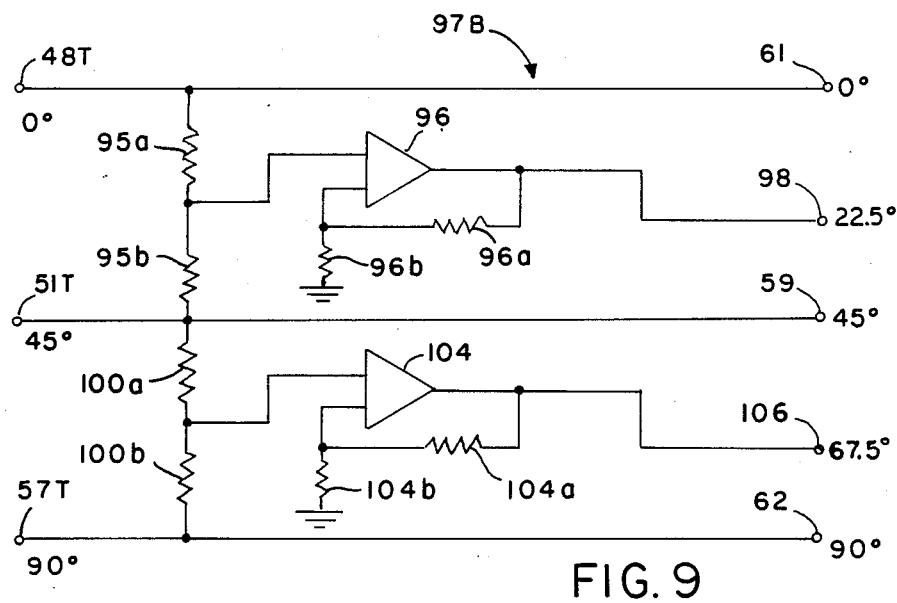
FIG. 9 shows the signals that are combined in a component block 97B of a "second-order" system embodiment, and its outputs.

A second-order system, in which a block 97B is substituted for the block 97A of FIG. 4A, is shown in FIG. 9. Block 97B has three inputs, namely a line from terminal 48T, one from 51T and one from 57T, which are the outputs of the three amplifiers 48, 51 and 57 of FIG. 4. These three signals are conducted directly to three output terminals of block 97B, namely terminals 61, 59 and 62, respectively.

In addition, the signal of terminal 48T is conducted through a resistor 95a to a non-inverting input of a summing amplifier 96 (FIG. 9). Another signal is conducted from terminal 51T through a resistor 95b to the same input terminal of amplifier 96. The voltage gain of amplifier 96, which is 1.082, is established by a feedback resistor 96a connected from output to a second, inverting, input terminal of amplifier 96, and a resistor 96b from that input terminal to ground. The output of amplifier 96 is conducted to a terminal 98, which represents the 22.5 degree output terminal of the block 97B.

In FIG. 9, a summing amplifier 104 receives a signal from terminal 51T through a resistor 100a to one of its input terminals, and receives another signal from the terminal 57T through a resistor 100b to that same input terminal. The gain of amplifier 104, which is 1.082, is established by resistors 104a and 104b. The output of amplifier 104 is conducted to a terminal 106 at the output of block 97B, where it serves as a 67.5 degree directional signal for the displacement sensor.

Figure 10:
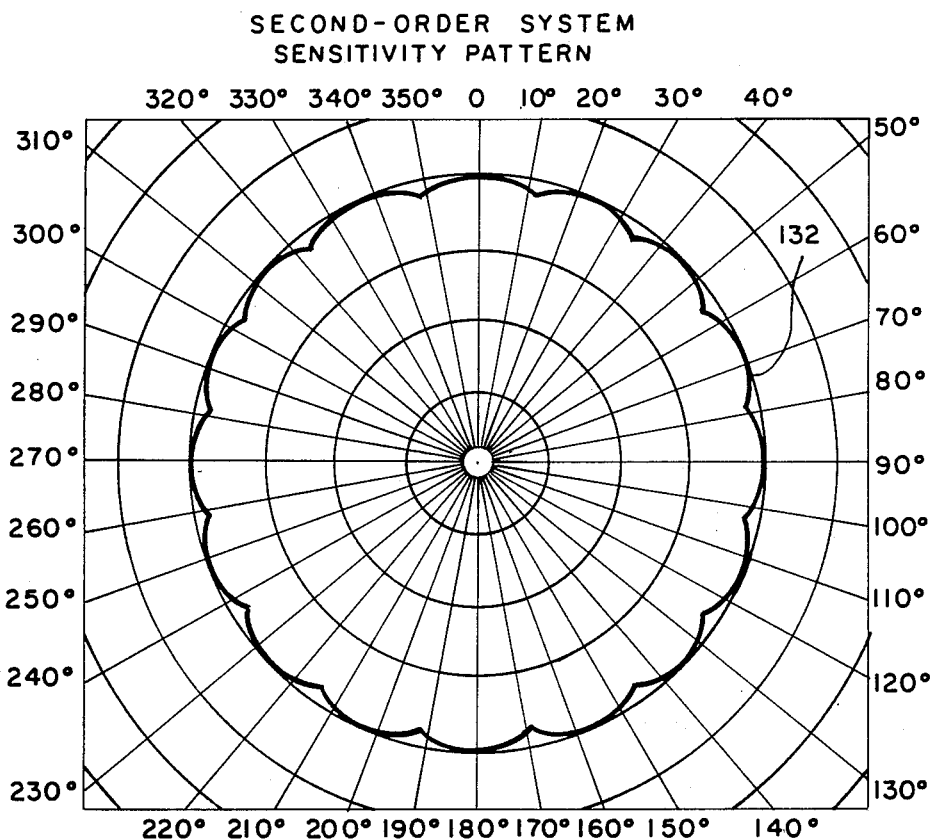
FIG. 10 is a polar coordinate graph of the displacement sensitivity of the sensor as a function of direction of displacement, illustrating a response pattern for a "second-order" system embodiment.

The embodiment of FIG. 9 produces the flower-shaped sensitivity pattern of FIG. 10, which is similar to that of FIG. 8 except that it has smaller dimples, and sixteen of them. It therefore has smaller maximum errors, because it is a second-order system whose amplifiers 96 and 104 provide appropriate correction signals for the angles 22.5 degrees and 67.5 degrees. (All other quadrants are mapped into the first quadrant.) The maximum error for this second-order system is about 2 percent.

Figure 11:
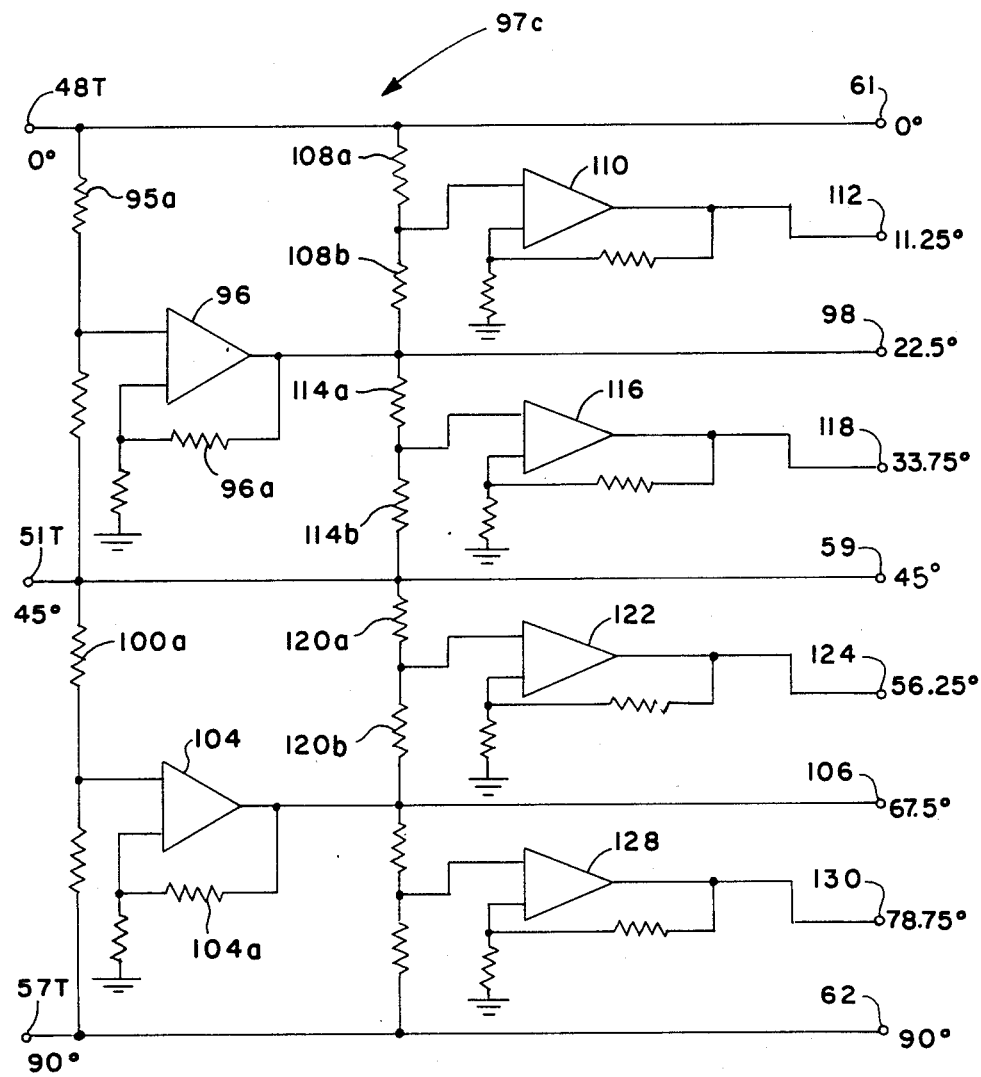
FIG. 11 shows the signals that are combined in a component block 97C of a "third-order" system embodiment, and its outputs.

In the embodiment of FIG. 11 a still further refinement (third-order) is presented, in which additional amplifiers correct the dimples at 11.25 degrees, 33.75 degrees, 56.25 degrees and 78.75 degrees, leaving much smaller dimples in the directional sensitivity pattern at the angles 5.625 degrees, etc.

The third-order system of FIG. 11 utilizes a block 97C in place of the block 97A of FIG. 4A. Block 97C has three inputs 48T, 51T and 57T, as in earlier-described systems. These inputs are conducted directly to output terminals 61, 59 and 62, as before. Moreover, amplifiers 96 and 104 are present in FIG. 11, along with their input resistors and gain resistors. Their outputs are conducted to terminals 98 and 106 to represent the 22.5 degree and 67.5 degree outputs of block 97C, as was the case in the previously described second-order system.

In the third order system 97C of FIG. 11, however, an additional amplifier 110 has input signals conducted to a non-inverting input terminal through a resistor 108a from terminal 48T, and through a resistor 108b from terminal 98. Amplifier 110 also has a negative feedback resistor 110a from its output terminal 112 to a second, inverting, input terminal. A resistor 110b is connected from that inverting input terminal to ground. This amplifier 110, having a voltage gain of about 1.02, provides a 100% correct signal at 11.25 degrees, 33.75 degrees, 56.25 degrees, and 78.75 degrees. The maximum errors that occur with this third-order system occur when the direction of displacement of the post 12 is at angles of 5.625 degrees, 16.87 degrees, etc.

In FIG. 11, in an arrangement similar to that described in connection with amplifier 110 above, an amplifier 116 receives signals through resistors 114a and 114b from terminals 98 and 51T. It has a gain of about 1.02, and provides an output at a terminal 118 that is correct at 33.75 degrees direction of displacement of the movable post 12.

In the same way, amplifiers 122 and 128 derive input signals from terminals 51T and 106, and terminals 106 and 57T, and provide output signals at terminals 124 and 130 (FIG. 11). These terminals correspond to corrections for post displacement angles of 56.25 degrees and 78.75 degrees.

Amplifiers 122 and 128 have voltage gains of about 1.02 (FIG. 11). No flower-pattern figure is provided for the third-order system of FIG. 11, because its omnidirectional sensitivity pattern is almost a perfect circle, so a figure would not show the pattern's small dimples clearly. Its error is about ½ percent, as measured from a controlled direction such as zero degrees (terminal 61) to its greatest dimple depth, e.g., at 5.625 degrees.

Several specific embodiments have been disclosed in sufficient detail to enable others to practice the invention. Clearly, still higher orders of correction could easily be accomplished. Numerous other variations are also possible, which, as usual, are omitted from the description but are intended to be covered by the claims.

I claim:

1. A displacement gauge (3) for sensing displacement of an object (12), comprising:
   a plurality of proximity sensing means (24N & 37N, 24E & 37E, etc) positioned at angularly-spaced-apart directions from said object, for producing a set of primary direction signals (from 45, 54), each dependent upon the vector component of the object's displacement along a respective directional line (e.g. N-S, E-W);
   means (48, 57) receiving said set of primary direction signals, for converting them, in the event that the signals are not all of the same sign originally, to a second set of direction signals (at 48T, 57T) that are all of the same sign;
   addition means (FIG. 6, 62a, 62b, 51a) that scalarly add at least two of the direction signals of said second set, with predetermined appropriate weighting factors, for providing at least one composite direction signal (at 51T);
   whereby a first-order array of signals (at 59, 61, 62) is provided, comprising both said second set of direction signals (at 61, 62) and said composite signal (at 59), each signal of said first-order array indicating the magnitude of the object's displacement along a respective directional line.

2. A gauge as in claim 1 and further comprising means (FIG. 6, 64a) for selecting the greatest signal of said first-order array of signals and providing it as an indication of the magnitude of displacement of said object.

3. A gauge as in claim 2 and further comprising:
   means (66) for providing a predetermined reference level;
   comparator means (60a, 60c, 60e) for comparing a displacement signal with said predetermined reference level; and,
   means (60, 63, 65) for providing an indication when a displacement signal exceeds said reference level.

4. A gauge as in claim 1 and wherein:
   said proximity sensing means for producing a set of primary direction signals comprises means for producing a set of two primary direction signals (from 45, 54);
   said addition means (FIG. 6, 62a,62b, 51a) that scalarly add at least two of the direction signals of said second set comprises means for scalarly adding two of said direction signals of said second set to provide one composite direction signal (at 59), to provide said first-order array (at 60a, 60e, 60c) comprising said second set of direction signals (at 48T, 57T) and said composite signal (at 51T);
   means (95a, 95b, 96) for adding one of said primary direction signals (at 48T) to said composite signal (at 51T) with predetermined weighting to provide a first doubly-composite signal (at 98);
   means (100a, 100b, 104) for adding the other of said direction signals (at 57T) to said composite signal (at 51T) with predetermined weighting to provide a second double-composite signal (at 106);
   whereby a second-order array of signals is produced (at 59, 61, 62, 98, 106) including said first-order array of signals (at 59, 61, 62) and said first and second doubly-composite signals (at 98, 106).

5. A gauge as in claim 2 and further comprising means (110, 116, 122, 128) for scalarly adding the signals of said second-order array (at 61, 98, 59, 106, 62) to another signal of said second-order array, to provide a set of triply-composite signals (at 112, 118, 124, 130);

whereby a third-order array of signals is provided including said second-order array of signals (at 61, 98, 59, 106, 62) and said set of triply-composite signals (at 112, 118, 124, 130).

6. A gauge as in claim 5 and further comprising means (60, 64, 63) for selecting the greatest signal of said third-order array of signals and providing it as an indication of the magnitude of displacement of said object.

7. A gauge as in claim 4 and further comprising means (60, 64, 63) for selecting the greatest signal of said second-order array of signals and providing it as an indication of the magnitude of displacement of said object.

* * * * *